United States Patent Office 3,208,975
Patented Sept. 28, 1965

3,208,975
PROCESS FOR THE POLYMERIZATION OF ALDEHYDES USING A CHELATED ORGANOALUMINUM CATALYST
Edwin J. Vandenberg, Wilmington, Del., assignor to Hercules Powder Company, Wilmington, Del., a corporation of Delaware
No Drawing. Filed Dec. 22, 1961, Ser. No. 161,376
11 Claims. (Cl. 260—67)

This invention relates to a new process for polymerizing aldehydes and more particularly to the use of aluminumalkyl—chelates as catalysts for the polymerization, whereby high molecular weight poly(aldehyde)s are prepared, and more particularly to the production of crystalline poly(aldehyde)s.

The polymerization of aldehydes, particularly formaldehyde and acetaldehyde, to high molecular weight polymers is well known. Poly(formaldehyde) is a tough, crystalline polymer, and poly(acetaldehyde) is usually an amorphous, elastomeric polymer. More recently the polymerization of acetaldehyde to a crystalline polymer has been described. However, the yields of these crystalline polymers have been too low for commercial exploitation.

Now in accordance with this invention it has been found that aldehydes can be polymerized in high yields to high molecular weight polymers, many of which are crystalline, by using as the catalyst for the polymerization an organoaluminum compound that has been chelated by reacting the organoaluminum compound with from about 0.01 mole to about 2 moles of chelating agent per mole of aluminum. In some cases the polymerization is further enhanced by using as the catalyst an organoaluminum compound that has been chelated and then further reacted with water within the molar ratio of from about 0.1 mole to about 1.5 moles of water per mole of aluminum.

Any aldehyde can be homopolymerized or copolymerized with a second aldehyde by the process of this invention. Exemplary of the aldehydes that can be so homo- or copolymerized are the alkanals such as formaldehyde, acetaldehyde, propionaldehyde, butyraldehyde, isobutyraldehyde, pivalaldehyde, hexanal, octanal, etc.; alkenals such as acrolein, methacrolein, crotonaldehyde, etc.; aromatic aldehydes such as benzaldehyde, tolualdehyde, etc., aralkanals such as phenylacetaldehyde, etc.; heterocyclic aldehydes such as furfural; and halo-, alkoxy-, etc., substituted derivatives thereof such as chloral, trifluoroacetaldehyde, methoxyacetaldehyde, 3-ethoxy propionaldehyde, anisaldehyde (p-methoxybenzaldehyde), etc. Thus, any aldehyde having the general formula RCHO where R is hydrogen, alkyl, cycloalkyl, aryl, alkaryl, aralkyl, a heterocyclic radical containing O as the hetero atom, alkenyl, cycloalkenyl, haloalkyl, alkoxyalkyl, alkoxyaryl, etc., may be polymerized in accordance with this invention. Of particular importance is the preparation of crystalline polymers of those aldehydes wherein R is hydrogen or alkyl. Instead of using the aldehyde as such as the starting monomer, the equivalent cyclic low polymers may be used as, for example, instead of using formaldehyde as the starting monomer, trioxane may be used as the source of formaldehyde.

Any organoaluminum compound which has been chelated may be used as the catalyst for the polymerization of aldehydes in accordance with this invention. Exemplary of the organoaluminum compounds that can be reacted with a chelating agent and used are trialkylaluminum compounds, tricycloalkylaluminum compounds, triarylaluminum compounds, dialkylaluminum hydrides, monoalkylaluminum dihydrides, dialkylaluminum halides, monoalkylaluminum dihalides, dialkylaluminum alkoxides, monoalkylaluminum dialkoxides, and complexes of these compounds as, for example, the alkali metal aluminum tetraalkyls such as lithium aluminum tetraalkyl, etc. Thus, these compounds may be defined as any aluminum compounds containing an aluminum-to-carbon bond or having the formula $AlRX_2$ where R is any alkyl, cycloalkyl, alkenyl, cycloalkenyl, aryl or alkaryl radical and X may be alkyl, such as methyl, ethyl propyl, isopropyl, n-butyl, isobutyl, amyl, hexyl, octyl, decyl, etc., aryl, such as phenyl, tolyl, halophenyl, etc., cycloalkyl, such as cyclohexyl, alkenyl such as isoprenyl, cycloalkenyl such as cyclohexenyl, etc., hydrogen, halogen such as chlorine, fluorine, or bromine, alkoxy such as methoxy, ethoxy, isopropoxy, butoxy, isobutoxy, tert-butoxy, etc., and the radical

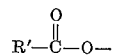

such as acetoxy, stearoxy( benzoxy, etc.: Another group of these compounds are those formed by reacting an aluminum alkyl with a polyol such as ethylene glycol, propylene glycol, glycerin, pentaerythritol, sorbitol, catechol, resorcinol, etc., in which case the X in the above formula would be —O—R″—O—AlRX, where R″ is alkylene, phenylene, etc. In some cases it may be desirable to complex the organoaluminum compound with a complexing agent such as tetrahydrofuran as, for example, triisobutylaluminum complexed with a molar amount of tetrahydrofuran, etc.

As pointed out above, the organoaluminum compounds are reacted with a chelating agent, i.e., a compound containing a chelate group, prior to their use as catalysts for the polymerization of aldehydes. Just why the chelated aluminum alkyls are so superior to the unchelated aluminum alkyls is not known. However, it has been found that this improved result is obtained when the organoaluminum compound is reacted with from about 0.01 to about 2 moles of the chelating agent per mole of aluminum, preferably with from about 0.1 to about 1.5 moles and more preferably with about 0.2 to about 1.0 mole per mole of aluminum alkyl. The optimum ratio will, of course, depend on the type of chelating agent, the aluminum alkyl, etc. If more than one chelating group is present in the chelating agent, the amount used will be proportionately lower.

Any organic compound that is capable of forming a ring by coordination with its unshared electrons and the aluminum atom may be used. These chelating agents form inner complexes with aluminum and preferably are characterized by two functional groups, one of which is an —OH group or —SH group as, for example, a hydroxyl, or an enol of a ketone, sulfoxide or sulfone, an —OH of a carboxyl group, etc., which —OH or —SH group interacts with, for example, a trialkylaluminum or dialkylaluminum hydride to form a conventional, covalent aluminum-oxygen or aluminum-sulfur bond according to the following equations:

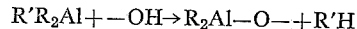

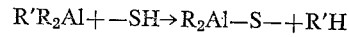

where R is alkyl and R′ is hydrogen or alkyl. The second functional group is one which contains an oxygen, nitrogen, or sulfur atom that forms a coordinate bond with the aluminum. Examples of groups containing such oxygen, nitrogen or sulfur atoms are:

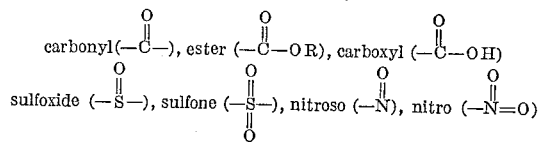

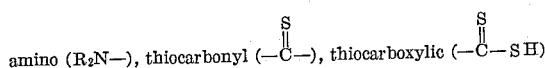

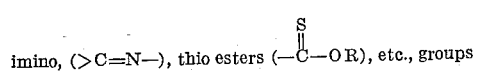

Such chelating agents can thus form from the organoaluminum compound a cyclic compound, i.e., an inner complex, of the following structure:

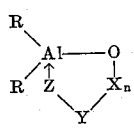

where R is alkyl, cycloalkyl, alkenyl, cycloalkenyl, aryl or alkaryl, Y is carbon, sulfur, or nitrogen and X represents the carbon, nitrogen, and oxygen atoms that may be present between the —YZ group and the —OH group in the chelating agent, $n$ being the number of such atoms. Chelating agents with an —SH group form a cyclic compound of the same type but with S in place of O. In the case of chelating agents containing the group —N=C—SH, the chelate may be a 4-atom cyclic compound. For example, with mercaptobenzothiazole, the chelate is a 4-atom cyclic compound which may have the formula:

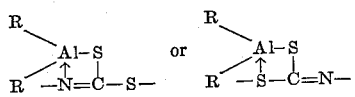

The ring size formed with the aluminum by the chelating agent preferably contains five or six atoms including the aluminum, but rings with four and seven atoms are also operable. Thus, $n$ in the above formula is preferably 2 but may be 0 to 3. The optimum ring size and the preferred chelating agent may vary somewhat with the nature of the substituent groups in the chelating agent as well as with the nature of the epoxide and other factors such as the polymerization diluent and temperature.

Exemplary of the chelating agents that may be reacted with the organoaluminum compound to produce the catalysts of this invention are diketones, such as acetylacetone, trifluoroacetylacetone, acetonylacetone, benzoylacetone, furoylacetone, thenoyltrifluoroacetone, dibenzoylmethane, 3-methl-2,4-pentane-dione, 3-benzyl-2,4-pentanedione, etc., ketoacids, such as acetoacetic acid, ketoesters such as ethyl acetoacetate, ketoaldehydes such as formylacetone, hydroxylketones such as hydroxyethyl methyl ketone, hydroxyacetone, o-hydroxyacetophenone, 2,5-dihydroxy-p-benzoquinone, etc., hydroxylaldehydes such as salicylaldehyde, hydroxy esters such as ethyl glycolate, 2-hydroxyethyl acetate, dicarboxylic acids and their esters such as oxalic acid, malonic acid, etc., monoesters of oxalic acid, mono- and diesters of malonic acid, etc., dialdehydes such as malonaldehyde, alkoxyacids such as ethoxyacetic acid, ketoximes such as 2,3-butane-dione-monoxime, dialdehyde monooximes such as glyoxal monoxime, hydroxamic acids such as N-phenyl benzohydroxamic acid, dioximes such as dimethyl glyoxime, nitro compounds such as 1,3-nitroalcohols, 1,3-nitroketones, 2-nitroacetic acid, nitroso compounds such as 1,2-nitrosooximes, amino alcohols such as ethanolamine, diethylaminoethanol, 8-hydroxyquinoline, 3-diethylaminopropylene oxide, 1,3-imino alcohols such as 3-imino-butanol-1, bis-salicylaldehyde-ethylene diimine (Schiff's bases), 1,3-keto (or aldo-)-imides such as acetylacetone mono-imide, mercaptothiazoles, etc. Chelating agents with two or more chelating functions may also be used, as for example, 2,5 - dihydroxy-p-benzoquinone, tetrahydroxyethylethylene diamine, bis(1,3-diketones) such as

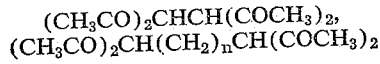

where $n$ is 2,6, or 10, bis(1,2-ketoximes), bis(1,2-dioximes), etc.

The chelate structures which can exist in two or more similar resonating forms are especially effective, as for example, when X has a double bond such as a C=C or C=N group in conjugation with YZ carbonyl which occurs in the case of 1,3-diketones, 1,2-ketoximes, etc. Where geometric isomers exist as, for example, α and β forms of some ketoximes and syn, anti, and amphi forms of some dioximes, it is generally preferable to use the α, anti and amphi forms or conditions where the compound will isomerize to the desired form, since these forms generally yield better chelates.

Any desired procedure may be used for reacting the organoaluminum compound with the specified molar ratio of chelating agent. It is readily done by adding the specified amount of chelating agent gradually to a solution of the organoaluminum compound in an inert diluent as, for example, a hydrocarbon diluent such as n-hexane, toluene, or an ether such as diethyl ether, tetrahydrofuran, etc., or a mixture of such diluents. It may also be done in the absence of a diluent. The organoaluminum chelate may be used immediately after preparation or it may be aged or, if desired, heat-treated in some cases.

As previously mentioned, the chelated organoaluminum compound is further enhanced for some polymerizations by reaction with water. In reacting the chelated organoaluminum compound with water there is used a molar ratio of from about 0.1 mole of water per mole of organoaluminum compound up to about 1.5 moles of water per mole of aluminum compound. Slightly higher amounts of water may be used, but at a ratio of about 2 moles of water to 1 mole of organoaluminum compound, there is little or no improvement over the use of no water; and, when the ratio of water to organoaluminum compound gets appreciably above 2:1, it has an adverse effect and the polymerization is retarded or otherwise adversely affected. Preferably the molar ratio of water to organoaluminum compound will be in the range of from about 0.2:1 to about 1:1. The exact amount of water will depend to some extent on the chelated organoaluminum compound, the aldehyde being polymerized, the diluent, temperature, etc. In any event, the amount of water should be such that the total moles of chelating agent and of water does not exceed the number of organoaluminum groups in the organoaluminum compound being reacted. Thus, with a trialkylaluminum the total moles of chelating agent and water should not exceed 3; for a dialkylaluminum halide, the sum should not exceed 2; etc.

Any desired procedure may be used for reacting the chelated organoaluminum compound with the specified molar ratio of water. Preferably this is done by adding the specified amount of water gradually to a solution of the chelated organoaluminum compound in an inert diluent, as, for example, a hydrocarbon diluent such as n-hexane, toluene, or an ether such as diethyl ether, tetrahydrofuran, etc., or a mixture of such diluents. It may also be done in the absence of a diluent. Instead of first reacting the organoaluminum compound with a chelating agent and then with water, the reverse order may be used, i.e. react the organoaluminum compound with the specified amount of water and then react it with the chelating agent. The chelating agent and prereacted organoaluminum-water product may laso be reacted in situ. These organoaluminum-chelate-water reaction products may be used immediately or aged or, if desired, heat-treated in some cases.

Another modification of the organoaluminum chelates that likewise gives enhanced results is to prepare an alkoxide-modified catalyst by reacting a trialkylaluminum or dialkylaluminum hydride with a chelating agent and, if desired, also with water, followed by reaction with an alcohol, the amount of alcohol used being within the range of from about 0.1 to about 2 moles of alcohol per mole of aluminum, but in an amount not to exceed the free alkyl groups left after the first two reactions. Thus, when the organoaluminum compound is reacted with chelating agent, water and alcohol, the total moles of these reactants must not exceed the number of organoaluminum groups in the organoaluminum compound. Any alcohol may be used in this reaction with the chelated organoaluminum compound as, for example, alkanols such as methanol, ethanol, isopropanol, tert.-butanol, etc., phenols such as phenol, catechol, resorcinol, hydroquinone, etc., and polyols such as ethylene glycol, glycerol, pentaerythritol, etc.

Any amount of organoaluminum chelate or organoaluminum-chelate-water reaction product may be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized. The amount used depends in part on such factors as monomer purity, diluent purity, etc., less pure aldehydes and diluents requiring more catalyst to destroy reactive impurities. In order to decrease catalyst consumption, it is generally preferred that impurities such as carbon dioxide, oxygen, alcohols, etc., be kept at as low a level as practical.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used as, for example, ethers such as the dialkyl, aryl, or cycloalkyl ethers as, for example, diethyl ether, dipropyl ether, diisopropyl ether, aromatic hydrocarbons such as benzene toluene, etc., or saturated aliphatic hydrocarbons and cycloaliphatic hydrocarbons such as n-heptane, cyclohexane, etc., and halogenated hydrocarbons as, for example, chlorobenzene or haloalkanes such as methyl chloride, methylene chloride, chloroform, carbon tetrachloride, ethylene dichloride, etc. Obviously, any mixture of such diluents may be used and in many cases is preferable. For example, when saturated aliphatic hydrocarbons are used as the diluent, it is preferable, particularly if high molecular weight polymers are desired or if very little diluent is present, to use them in admixture with ethers. A complexing agent for the organoaluminum compound, such as ether, tetrahydrofuran, etc., may be used and is particularly desirable in a bulk polymerization process.

The polymerization process in accordance with this invention may be carried out over a wide temperature range and pressure. Usually, it will be carried out at a temperature of from about $-150°$ C. to about $100°$ C. and more preferably within the range of from about $-100°$ C. to to about $50°$ C. The temperature used will depend upon the aldehyde and catalyst used, the source of the aldehyde, cyclic trimers generally requiring higher temperatures, etc. Usually, the polymerization process will be carried out at autogenous pressure, but superatmospheric pressures up to several hundred pounds may be used if desired, and in the same way, subatmospheric pressures may also be used.

The polymers produced in accordance with this invention are linear polymers which are believed to have a poly(acetal) structure, i.e., a polymer chain with alternate carbon and oxygen atoms. These poly(aldehyde)s being generally somewhat unstable, may be advantageously stabilized with antioxidants, acid acceptors or other agents known to stabilize poly(aldehyde)s.

The following examples illustrate the process of polymerizing aldehydes in accordance with this invention. All parts and percentages are by weight unless otherwise indicated.

EXAMPLES 1–11

In each of these examples the polymerization vessel, free of air, was charged under nitrogen with the diluent and 10 parts of acetaldehyde. After equilibrating at the reaction temperature, a solution of the catalyst was injected.

The catalyst used in the control was unmodified triethylaluminum which was added as a 1.4 molar solution in n-heptane. The catalyst used in Example 1 was prepared by adding sufficient ether to a 1.4 molar solution of triethylaluminum in n-heptane to make it 0.5 molar, cooling this solution to $0°$ C., and then adding acetylacetone in an amount equal to the specified molar ratio rapidly (in about 15 minutes) and stirring the mixture at $0°$ C. for 15 minutes and then 2 hours at room temperature. The catalysts used in Examples 2–4 were prepared by adding sufficient ether to a 1.4 molar solution of triethylaluminum in n-heptane to make it 0.5 molar, cooling this solution to $0°$ C., adding, during 15 minutes with stirring, water in an amount equal to the specified molar ratio and then adding acetylacetone rapidly (1–15 minutes) and stirring the mixture at $0°$ C. for 15 minutes and then 2 hours at room temperature. The catalyst used in Example 5 was prepared by diluting the catalyst solution used in Example 1 to an equal volume with n-heptane; and, after cooling to $0°$ C. and in the presence of glass beads, adding methanol in the specified molar ratio and agitating for 16 hours at $30°$ C. The catalyst used in Example 6 was prepared as described for Examples 2–4 except that the triethylaluminum solution was made 1 molar by dilution with ether instead of 0.5 molar. The catalysts used in Examples 7 and 8 were prepared from catalyst prepared as described in Example 6, except that the catalyst solution so prepared was then diluted to an equal volume with n-heptane; and, after cooling to $0°$ C. and in the presence of glass beads, methanol in the specified mole ratio was added and the catalyst solution was then agitated for 16 hours at $30°$ C. The catalysts used in Examples 9 and 10 were prepared from the respective catalysts described in Examples 3 and 4 by cooling to $0°$ C. and in the presence of glass beads adding the specified mole ratio of methanol and then agitating for 16 hours at $30°$ C. The catalyst used in Example 11 was prepared by diluting a heptane solution of triisobutylaluminum to about 0.5 molar with ether, cooling to $0°$ C. and adding 0.5 mole of water per mole of aluminum during about 15 minutes, stirring the mixture at $0°$ C. for 1 hour and then at room temperature for 20 hours, again cooling to $0°$ C., adding 0.5 mole of acetylacetone per mole of aluminum during about 15 minutes, stirring for 1 hour at $0°$ C. and then for 20 hours at room temperature. In Examples 1–10 and the control, the amount of catalyst used was 0.46 part of triethylaluminum modified as indicated, and in Example 11 there was used 0.79 part of triisobutylaluminum modified as indicated.

The polymerization reaction mixtures were agitated at the given reaction temperature for the specified time, after which the polymerization was stopped by adding 4 parts of acetone. In each of these examples only the crystalline polymer was isolated. The reaction mixture was filtered, washed with n-heptane, washed twice with 40 parts of acetone, washed once with 40 parts of 88% methanol containing 0.2% sodium bicarbonate, and finally was washed twice with 40 parts of acetone. The insoluble product was then soaked in 40 parts of acetone containing 0.2% phenyl-$\beta$-naphthylamine and 0.2% of Stabilizer A5 (diglycidyl ether of bisphenol A). The polymer was then collected and dried for 16 hours at room temperature under vacuum.

Tabulated below for each example is the diluent used and the amount thereof, the catalyst used, the reaction time and temperature, together with the percent conversion to isolated polymer and the degree of crystallinity as determined by X-ray analysis.

Table

| Examples | Diluent | Parts | Catalyst [1] | Reaction Time, hrs. | Reaction Temp., °C. | Isolated polymer Percent conv. | Isolated polymer X-ray cryst. |
|---|---|---|---|---|---|---|---|
| Control | n-Heptane | 32.2 | $Al(C_2H_5)_3$ | 19 | −78 | 1.6 | Low. |
| 1 | do | 28.6 | $Al(C_2H_5)_3$-0.5A | 4.5 | −78 | 4.2 | High. |
| 2 | do | 28.6 | $Al(C_2H_5)_3$-0.5$H_2$O-0.5A | 4.5 | −78 | 19 | Do. |
| 3 | Ether | 30.2 | $Al(C_2H_5)_3$-0.5$H_2$O-0.5A | 4.5 | −78 | 48 | Do. |
| 4 | do | 13.6 | $Al(C_2H_5)_3$-0.5$H_2$O-1.0A | 19 | −78 | 47 | Do. |
| 5 | do | 13.6 | $Al(C_2H_5)_3$-0.5A-1.5$CH_3$OH | 19 | −78 | 10.2 | Do. |
| 6 | do | 14.3 | $Al(C_2H_5)_3$-0.5$H_2$O-0.04A | 22 | −78 | 20 | Low. |
| 7 | do | 14.3 | $Al(C_2H_5)_3$-0.5$H_2$O-0.04A-1.0$CH_3$OH | 22 | −78 | 43 | High. |
| 8 | do | 14.3 | $Al(C_2H_5)_3$-0.5$H_2$O-0.04A-1.5$CH_3$OH | 22 | −78 | 71 | Do. |
| 9 | do | 14.3 | $Al(C_2H_5)_3$-0.5$H_2$O-0.5A-1.0$CH_3$OH | 22 | −78 | 63 | Do. |
| 10 | do | 14.3 | $Al(C_2H_5)_3$-0.5$H_2$O-1.0A-1.0$CH_3$OH | 22 | −78 | 58 | Do. |
| 11 | do | 13.6 | $Al(i-C_4H_9)_3$-0.5$H_2$O-0.5A | 19 | −78 | 52 | Do. |

[1] A=Acetylacetone.

The poly(acetaldehyde) obtained in Example 8 had a high degree of crystallinity, and it was insoluble in chloroform, tetrahydrofuran, benzene, cyclohexanone, dimethylformamide, dimethyl sulfoxide and 60:40 phenol:tetrachloroethane at room temperature.

EXAMPLE 12

Example 1 was repeated except that isobutyraldehyde was substituted for the acetaldehyde used in that example. The poly(isobutyraldehyde) so obtained was a hard, tough solid and amounted to a conversion of 17 percent. It was shown to have a high degree of crystallinity by X-ray analysis.

EXAMPLE 13

Ten parts of acetaldehyde was polymerized in n-heptane (28.6 parts) by the general procedure described in Examples 1–11. The catalyst used was 0.46 part of triethylaluminum which had been reacted with 0.5 mole of water per mole of aluminum and 1.0 mole of acetylacetone per mole of aluminum as described in Examples 2–4. The polymerization reaction was carried out at 0° C. for 7 hours. The poly(acetaldehyde) which was a hard solid was isolated by evaporating the diluent.

EXAMPLE 14

Example 4 was repeated except that the catalyst used was 0.46 part of triethylaluminum which had first been reacted with 0.5 mole of acetylacetone per mole of aluminum and then with 0.5 mole of water per mole of aluminum. The polymer which was isolated in high conversion was highly crystalline by X-ray analysis.

EXAMPLE 15

Example 2 was repeated except that 10 parts of trioxane was used instead of acetaldehyde and the polymerization reaction was carried out at 65° C. for 29 hours. The polymer was isolated by the same procedures described in Example 2 and was shown by X-ray analysis to have the same pattern as crystalline poly(formaldehyde).

When the same procedure was used, but substituting unmodified triethylaluminum as the catalyst, there was isolated a small amount of white powder which was not crystalline as shown by X-ray analysis.

What I claim and desire to protect by Letters Patent is:

1. The process of preparing linear poly(aldehydes) which comprises polymerizing aldehydes by contacting at least one of said aldehydes at a temperature of from about −150° C. to about +100° C. with, as a catalyst, a chelated organoaluminum compound formed by chelating an organoaluminum compound with a chelating agent selected from the group consisting of diketones, ketocarboxylic acids and esters thereof, ketoaldehydes, hydroxyketones, hydroxyaldehydes, hydroxycarboxylic acid esters, dicarboxylic acids and esters thereof, dialdehydes, alkoxycarboxylic acids, ketoximes, dialdehyde monoximes, hydroxamic acids, dioximes, and amino alcohols, in an amount such that the molar ratio of the chelating agent to the organoaluminum compound is within the range of from about 0.01 to about 2, said organoaluminum compound having the formula $AlRX_2$ where R is a radical selected from the group consisting of alkyl, cycloalkyl, alkenyl, cycloalkenyl, aryl, and alkaryl radicals containing from 1 to 10 carbon atoms and X is selected from the group consisting of R, H, halogen, and alkoxy groups containing from 1 to 4 carbon atoms and said aldehyde having the formula RCHO where R is a radical selected from the group consisting of H, alkyl, cycloalkyl, aryl, alkaryl, aralkyl, a heterocyclic radical wherein the hetero atom is O, alkenyl, cycloalkenyl, haloalkyl, alkoxyalkyl, and alkoxyaryl, said aldehyde containing from 1 to 8 carbon atoms.

2. The process of claim 1 wherein the aldehyde that is polymerized is an alkanal containing from 1 to 8 carbon atoms.

3. The process of claim 2 wherein the organoaluminum compound is a trialkylaluminum and the chelating agent is a diketone.

4. The process of claim 3 wherein the trialkylaluminum is reacted with said diketone and also with water in a molar ratio of from about 0.1:1 to about 1.5:1 of said water to aluminum, the total of the molar ratio of diketone and water to aluminum being within the range of from about 0.11:1 to about 3:1.

5. The process of claim 4 wherein acetaldehyde is homopolymerized.

6. The process of claim 4 wherein isobutyraldehyde is homopolymerized.

7. The process of claim 4 wherein formaldehyde is homopolymerized.

8. The process of claim 3 wherein the trialyklaluminum is reacted with said diketone and also with an alkanol containing from 1 to 4 carbon atoms in a molar ratio of from about 0.1:1 to about 2:1 of said alkanol to aluminum, the total of the molar ratio of diketone and alkanol to aluminum being within the range of from about 0.11:1 to about 3:1.

9. The process of claim 2 wherein the trialkylaluminum is reacted with the diketone in a molar ratio of diketone to aluminum of from 0.01:1 to about 2:1, and also, with water in the molar ratio of water to aluminum of from about 0.1:1 to about 1:1, and with an alkanol containing from 1 to 4 carbon atoms in a molar ratio of alkanol to aluminum of from about 0.1:1 to about 2:1, the total of the molar ratio of diketone, water and alkanol to aluminum being within the range of from about 0.21:1 to about 3:1.

10. The process of claim 9 wherein the acetaldehyde is homopolymerized.

11. The process of claim 10 wherein the diketone is acetylacetone, the trialkylaluminum is triethylaluminum, and the alkanol is methanol.

References Cited by the Examiner
UNITED STATES PATENTS

| | | | |
|---|---|---|---|
| 2,568,426 | 9/51 | Whetstone et al. | 260—67 |
| 2,848,437 | 8/58 | Langsdorf et al. | 260—67 |
| 2,933,474 | 4/60 | Handy et al. | 260—47 |
| 2,933,475 | 4/60 | Hoover et al. | 260—67 |
| 3,016,297 | 1/62 | Mochel et al. | 260—67 |
| 3,058,922 | 10/62 | Vandenberg | 260—2 |
| 3,135,705 | 6/64 | Vandenberg | 260—2 |

OTHER REFERENCES

Natta et al., Accademia Nazionale Dei Lincei, Serie VIII, vol. XXVIII, pp. 8–17, January 1960. (A collection of the Original Papers, vol. VI, sec. 191.)

Furukawa et al., Die Makromolekulare Chemie, vol. 44, March 1961, pp. 398–407.

Furukawa et al., Polymer Reviews, 3, Polymerization of Aldehydes and Oxides, 1963, Interscience Publishers, New York.

WILLIAM H. SHORT, *Primary Examiner*.

LOUISE P. QUAST, *Examiner*.

UNITED STATES PATENT OFFICE
CERTIFICATE OF CORRECTION

Patent No. 3,208,975 September 28, 1965

Edwin J. Vandenberg

It is hereby certified that error appears in the above numbered patent requiring correction and that the said Letters Patent should read as corrected below.

Column 2, line 20, for "stearoxy(" read -- stearoxy, --; column 3, line 47, for "-methl-" read -- -methyl- --; column 4, line 66, for "laso" read -- also --; column 6, line 60, for "triisobultyl-" read -- triisobutyl- --; column 8, line 68, for the claim reference numeral "2" read -- 3 --.

Signed and sealed this 19th day of April 1966.

(SEAL)
Attest:

ERNEST W. SWIDER
Attesting Officer

EDWARD J. BRENNER
Commissioner of Patents